Jan. 7, 1964
R. F. STEWART
3,117,216
RESISTANCE WELDER
Filed Oct. 25, 1961
2 Sheets-Sheet 1
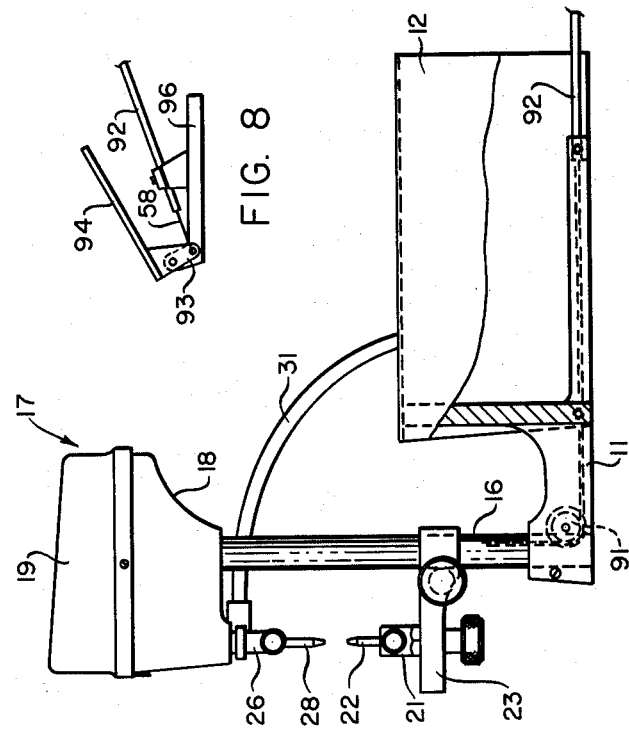
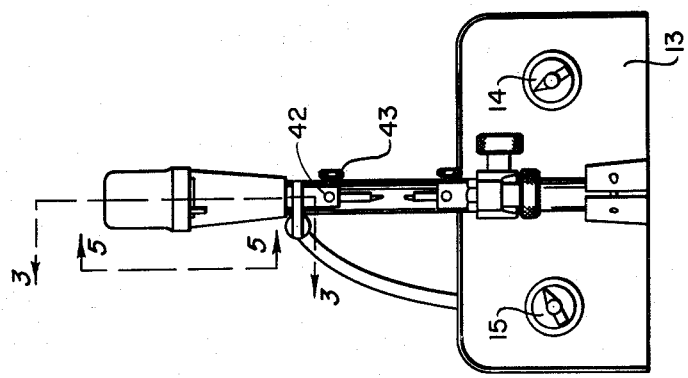
RAYMOND F. STEWART
*INVENTOR.*
BY
*Flehr and Swain*
ATTORNEYS Jan. 7, 1964    R. F. STEWART    3,117,216
RESISTANCE WELDER Filed Oct. 25, 1961    2 Sheets-Sheet 2

RAYMOND F. STEWART
INVENTOR.

BY
*Flehr and Swain*
ATTORNEYS

大专利 Office 3,117,216
Patented Jan. 7, 1964

3,117,216
RESISTANCE WELDER
Raymond F. Stewart, 552 Bean Creek Road,
Santa Cruz, Calif.
Filed Oct. 25, 1961, Ser. No. 147,591
12 Claims. (Cl. 219—86)

This invention relates generally to resistance welders and more particularly to resistance welders of the type commonly referred to as spot welders.

As is well known, spot welders operate by resistance heating of the material being joined. Generally, the parts to be joined are squeezed between a pair of electrodes and current is passed from one electrode to the other through the material. The power losses in the material cause heating of the material to such an extent that a localized region of the parts softens and the material fuses together.

The high currents required may be obtained from the secondary of a transformer with the turns ratio such that the required A.-C. current is passed between the electrodes. The required currents may also be obtained by storing charge in a capacitor and then discharging a capacitor through the material to cause current to pass through the material. Circuits for generating suitable A.-C. or D.-C. currents are well known in the art.

Most welders of the prior art must be permanently mounted on a bench or table with the controls extending through the table.

It is an object of the present invention to provide a welder which need not be permanently mounted and which can be placed anywhere.

In the prior art welders, one electrode is adjustable while the other is movable to clamp or pinch the material being welded with sufficient pressure to keep the parts together, provide a low resistance contact with the electrodes and form a good weld. Welders of this type have various arrangements for adjusting the welding pressure. In general, such means comprise a coil spring together with means for controlling the compression of the coil spring. Such an adjustment provides highly variable pressures.

It is another object of the present invention to provide a spot welder in which the pressure exerted on the material by the electrodes can be accurately controlled.

In general, the electrodes of the prior art are shaped and mounted so that they can be used to weld pieces of many configurations and in different orientations and locations. However, in the prior art, the electrodes are not fully adjustable and difficulty is often experienced in making certain welds.

It is a further object of the present invention to provide a spot welder in which one of the electrode holders is mounted in such a manner that a variety of welding positions are provided so as to enable many orientations and positions of the electrode holders.

The foregoing and other objects of the invention will become more clearly apparent from the following description when taken in conjunction with the accompanying drawings.

Referring to the drawings:

FIGURE 1 is a front elevational view of a welder in accordance with the invention;

FIGURE 2 is a side elevational view of a welder in accordance with the present invention;

FIGURE 8 shows an actuating foot pedal.

Figure 3:
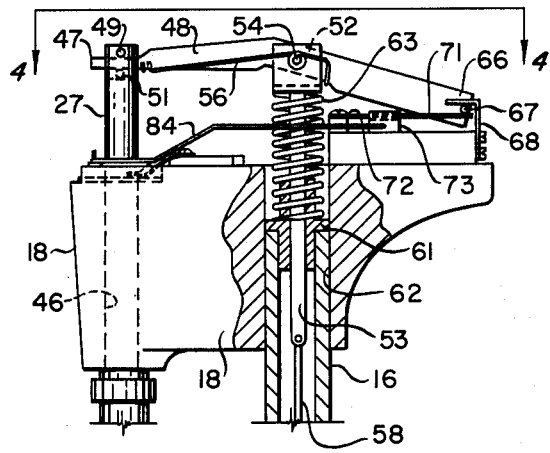
FIGURE 3 is a view, partly in section, of the head of the welder, the view being taken generally along the lines 3—3 of FIGURE 1.

The welder includes a casting 11 which receives a cover 12. The upwardly extending panel 13 of the casting mounts control knobs 14 and 15. The casting 11 extends forward to receive and support the hollow post 16. A head assembly designated generally by the reference numeral 17, including the head casting 18 and a cover 19, is supported by the post 16.

A lower electrode holder 21 serves to carry an electrode 22. The electrode holder is carried by the arm 23, to be presently described in detail. The upper electrode holder 26 is carried by a shaft 27 (FIGURE 3) which is driven to move the electrode 28 carried by the holder in a vertical direction towards and away from the electrode 22.

Electrical energy is supplied to the upper electrode through a cable 31. The return path is through the lower electrode along post 16 and casting 11 to the electrical circuit.

The arm 23 includes a slot 32 (FIGURES 6 and 7) which serves to slidably receive therealong the electrode holder 21. The electrode holder 21 is provided with an upper flange 33 which rides on the upper surface of the arm, and a lower clamping screw 36 threadably received by the electrode holder 21 and which serves to fixedly clamp the electrode holder onto the arm. The electrode holder 21 is rotatable within the slot whereby it can be oriented in any position to position an electrode of the type shown in FIGURES 6 and 7.

The other end of the arm 23 is bored to provide a cylindrical opening 37 to guide the arm on the post 16. The arm is slotted at 38 and threadably receives a clamping screw 39. When the screw is clamped, the arm is fixed on the post 16. The arm 23 may slide along the post to adjust its vertical position. The arm is rotated to adjust its radial position. The lower electrode holder 21 is adjustable along the arm 23 to fix it rotatably on the arm. Thus, an electrode can be positioned as desired to accommodate work of any configuration. The adjustment is quick, simple and enables a wide variety of weld positions with a minimum number of electrodes.

Figure 6:
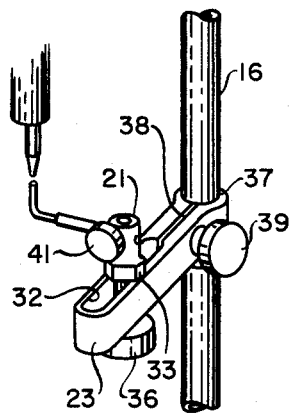
FIGURE 6 is a view showing the electrode holder in one possible position with a different type of electrode.
Figure 4:
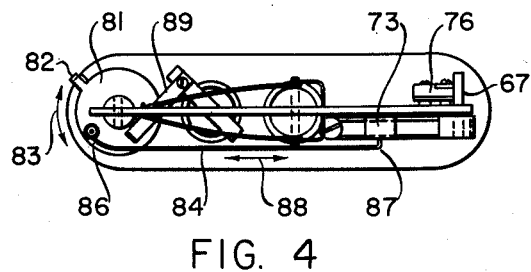
FIGURE 4 is a top view of the head, the view being taken generally along the lines 4—4 of FIGURE 3.
Figure 5:
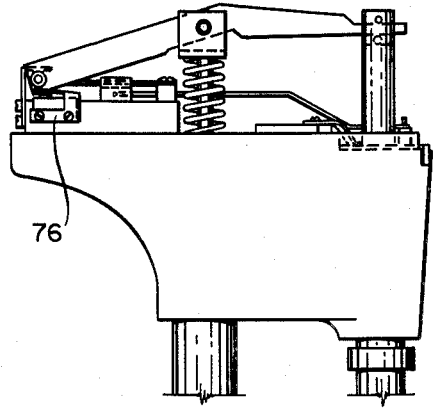
FIGURE 5 is a side elevational view of the welder, the view being taken generally along the line 5—5 of FIGURE 1 with the cover removed.
Figure 7:
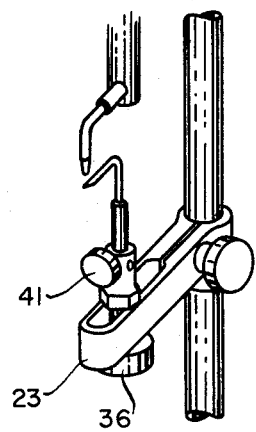
FIGURE 7 shows the electrode holders in still another possible position.

The electrode holder includes an axial opening for receiving an electrode such as shown in FIGURE 7 and a radial opening for receiving an electrode such as shown in FIGURE 6. A clamping screw 41 is threadably received by the electrode holder to clamp the electrode.

Similarly, the upper electrode holder 26, FIGURES 1 and 2, includes an axial opening for receiving an electrode such as shown in the figures and a radial opening 42 for receiving an electrode as shown in FIGURE 7. The electrode holder includes a clamping means 43 in the form of a screw which is threadably received by the electrode holder and serves to secure the electrode within the same.

The shaft 27 (FIGURE 3) is slidably received in the opening 46 formed in the casting 18. The upper end of the shaft 27 is slotted to provide a yoke which accommodates one end 47 of the rocker arm 48. Spaced pins 49 and 51 are provided for holding the rocker arm within the yoke.

The rocker arm 48 is accommodated intermediate its ends in a yoke 52 carried by the rocker arm shaft 53. A pin 54 extends through the yoke and rocker arm to pivotally hold the rocker arm. A spring 56 is wound around the pin 54 and has one end engaging the lower side of the rocker arm adjacent the yoke 52 and its other end engaging the rocker arm adjacent the pin 49. The action of the spring 56 is to cause the rocker arm to be urged in a counter-clockwise direction to counterbalance the weight of various parts so that relatively low weld pressure can be achieved.

The rocker arm shaft 53 extends within the hollow post 16 and is engaged by a flexible member or cable 58, to be presently described. The shaft 53 is slidably received by a sleeve 61 which is accommodated within the bore 62 of the casting 18 and by the hollow post 16. The sleeve 61 also acts as a stop for the rocker arm compression spring 63 so that the spring is compressed between the yoke and the sleeve 61 to urge the yoke upwardly whereby the rocker arm lifts the shaft 27 to its uppermost position and to bring the other end 66 of the rocker arm upwardly until the pin 67 abuts the stop 68.

The pin 67 rides on a leaf spring 71 which has one end 72 permanetly affixed, while its other end cantilevers outwardly therefrom. A block 73 is slidable along the spring whereby the free length of spring can be adjusted. Thus, as the stop is moved towards the right as viewed in the figure, the amount of spring which is free is reduced. As is well known, this will increase the resistance against deflection of the spring and thus more force will be required by the pin 67 to deflect the spring.

Disposed below the pin is a microswitch 76 which has its activating element activated by the other end of the pin 67. Thus, as the spring deflects, the microswitch is activated. Activation of the microswitch serves to provide a pulse of weld current.

The action then is substantially as follows. The position of the block 73 is adjusted as will be presently described for a particular weld pressure. The flexible member 58 is drawn downwardly whereby the rocker arm is urged down. The pin 67 will strike the spring and the rocker arm will rotate about this end as a fixed point urging the upper electrode holder downwardly toward the lower electrode holder to provide pressure. As the electrode holders clamp the material being welded, the pressure on the spring will increase. When the pressure is such that the force on the pin 67 exceeds the spring force of the leaf spring 71, the spring is deflected and further movement of the flexible member 58 downwardly will cause the pin to move downwardly and activate the switch whereby a weld current is passed through the material being welded.

The position of the spring block 73 is adjusted by a pressure adjusting member 81 which includes an activating lever 82. By movement of the lever 82 as indicated by the arrow 83, the member 81 is rotated. A link 84 has one end 86 pivotally secured to the member 81 and its other end 87 secured to the block. Thus, movement of the lever 82 as indicated by the arrow will cause the link 84 to move as indicated by the arrow 88 and adjust the pressure of the pressure block. The position of the member 81 is held by a friction spring 89 which rides against its upper surface to thereby provide frictional force which prevents movement.

The flexible member 58 extends downwardly through the hollow shaft, as shown in FIGURE 8, over a pulley 91 and extends through the flexible sheath 92 of a flexible drive cable. The flexible member 58 has its other end engaged with the lever 93 of foot pedal 94. The sheath 92 is fixed to the base 96 of the foot lever. Deflection of the foot pedal will serve to move the flexible member 58. Since the casting 11 is fixed to one end of the sheath and the base of the foot pedal to the other, these parts will have a fixed spacing while the flexible member is moved to provide the welding pressure. This permits positioning of the welder on any surface at any location since there will be no tendency for the welder to move when it is operated.

Thus, there is provided a resistance welder including electrodes having substantially universal holders. The weld pressure can be accurately adjusted over a wide range of values. The welder is simple in construction and usable on a wide variety of supports.

I claim:

1. A welder comprising a welder casting, a post having its lower end mounted on the casting to be supported therefrom, an electrode holder arm rotatably and slidably carried by said post, means for releasably clamping the electrode holder arm to the post, an electrode holder carried by said electrode holder arm, said electrode holder being positionable along the electrode holder arm and rotatable thereon, means for releasably clamping the electrode holder to the electrode holder arm, a head assembly carried at the other end of said post, said head assembly including an electrode holder shaft slidably carried by said head assembly for movement with its axis substantially parallel to the axis of the post, an electrode holder carried by one end of said electrode holder shaft, and means connected to the other end of said electrode holder shaft for moving the same towards and away from the electrode holder arm.

2. A welder comprising a casting, a post having one end mounted on the casting to be supported therefrom, an arm rotatably and slidably carried by said post, means for releasably clamping the arm to the post, an electrode holder carried by said arm, said electrode holder being positionable along the arm and rotatable thereon, means for releasably clamping the electrode holder to the arm, a head assembly carried at the other end of said post, said head assembly including a casting, an electrode holder shaft slidably carried by said casting with its axis substantially parallel to the axis of the post, an electrode holder carried by one end of said electrode holder shaft, a rocker arm having one end cooperating with the other end of said electrode holder shaft for moving the same axially to move the electrode holder towards and away from the arm, yieldable spring means cooperating with the other end of said arm, a rocker arm shaft carried by said head casting engaging the rocker arm intermediate its ends, and means for moving the rocker arm shaft, said rocker arm serving to move the electrode holder towards the arm to clamp a work piece between electrodes carried by the electrode holders.

3. A welder as in claim 2 wherein the spring comprises a cantilevered leaf spring having its free end cooperating with the adjacent end of the rocker arm, and a spring block cooperating with the spring and adjustable therealong to thereby adjust the free length of spring to adjust the spring constant to control the clamping pressure.

4. A welder as in claim 3 wherein a lever assembly cooperates between the spring block and a control lever to position the block from the lever.

5. A welder comprising a positionable electrode holder mounted on a post, a head assembly carried at one end of said post, said head assembly including a casting, an electrode holder shaft slidably carried by said casting with its axis substantially parallel to the axis of the post, an electrode holder carried by one end of said electrode holder shaft, a rocker arm having one end cooperating with the other end of said electrode holder shaft for moving the same axially to move the electrode holder towards and away from the positionable electrode holder, yieldable spring means cooperating with the other end of said rocker arm, a rocker arm shaft carried by said head casting engaging the rocker arm intermediate its ends, and means for moving the rocker arm shaft, said rocker arm serving to move the electrode holders towards one another for clamping a work piece between electrodes carried by the electrode holders.

6. A welder as in claim 5 wherein the spring comprises a cantilevered leaf spring having its free end cooperating with the adjacent end of the rocker arm, and a spring block cooperating with the spring and adjustable therealong to thereby adjust the free length of spring to adjust the spring constant to control the clamping pressure.

7. A welder as in claim 6 wherein a lever assembly cooperates between the spring block and a control lever to position the block from the lever.

8. A welder comprising a welder casting, a post having one end mounted on the casting to be supported therefrom, an electrode arm rotatably and slidably carried by said post, means for releasably clamping the electrode arm to the post, an electrode holder carried by said electrode arm, said electrode holder being positionable along the electrode arm and rotatable thereon, means for releasably clamping the electrode holder to the electrode arm, a head assembly carried at the other end of said post, said head assembly including a head casting, an electrode holder shaft slidably carried by said head casting with its axis substantially parallel to the axis of the post, an electrode holder carried by one end of said electrode holder shaft, means connected to the other end of said electrode holder shaft for moving the same axially to move the electrode holder towards and away from the electrode arm, a foot pedal housing, a foot pedal mounted on said housing, a flexible member connected between the foot pedal and the last named means whereby movement of the pedal serves to activate said means, and a sheath having one end connected to the foot pedal housing and the other end to the welder casting thereby preventing relative movement between the same when the foot pedal is activated.

9. A welder comprising an adjustable electrode mount, a head assembly including an electrode shaft movable with respect to the head assembly, a rocker arm having one end engaging the electrode shaft to move the same within the assembly so that an electrode mounted thereon is moved towards and away from an electrode mounted on the adjustable electrode mount, yieldable spring means cooperating with the other end of the rocker arm for determining the clamping pressure, means engaging the rocker arm intermediate its ends, and means for moving said last named means so that the rocker arm serves to move the electrode shaft towards and away from the electrode mount.

10. A welder as in claim 9 wherein said spring comprises a cantilevered leaf spring cooperating with the rocker arm.

11. A welder as in claim 10 including a microswitch positioned to be actuated by said cantilevered leaf spring when the spring is deflected by the rocker arm.

12. A welder as in claim 11 wherein the free length of the cantilevered spring is adjustable.

References Cited in the file of this patent

UNITED STATES PATENTS

| | | |
|---|---|---|
| 1,673,500 | Dwyer | June 12, 1928 |
| 2,130,657 | Watkin | Sept. 20, 1938 |
| 2,154,935 | Hall | Apr. 18, 1939 |
| 2,883,516 | Bek | Apr. 21, 1959 |
| 2,969,453 | Page | Jan. 24, 1961 |